United States Patent
Lee (10) Patent No.: US 8,755,696 B2
(45) Date of Patent: Jun. 17, 2014

(54) METHOD AND APPARATUS FOR CONTROLLING AN OPTICAL RECEIVER HAVING DELAY PATHS

(75) Inventor: Jyung-Chan Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 63 days.

(21) Appl. No.: 13/483,599

(22) Filed: May 30, 2012

(65) Prior Publication Data

US 2012/0308230 A1    Dec. 6, 2012

(30) Foreign Application Priority Data

May 30, 2011    (KR) .......................... 10-2011-0051689

(51) Int. Cl.
*H04B 10/06*    (2006.01)

(52) U.S. Cl.
USPC ............ 398/208; 398/202; 398/209; 398/212; 398/213; 398/158; 398/33; 398/38

(58) Field of Classification Search
USPC ......... 398/202, 208, 209, 210, 211, 212, 213, 398/214, 204, 205, 206, 207, 183, 188, 158, 398/159, 147, 81, 33, 38, 27
See application file for complete search history.

(56) References Cited

U.S. PATENT DOCUMENTS

| 7,477,852 | B2 * | 1/2009 | Agarwal et al. ................ 398/210 |
| 7,949,261 | B2 * | 5/2011 | Mikkelsen et al. ........... 398/208 |
| 2007/0047954 | A1 | 3/2007 | Mamyshev |
| 2008/0225381 | A1 * | 9/2008 | Heffner et al. ................ 359/325 |

* cited by examiner

*Primary Examiner* — Hanh Phan
(74) *Attorney, Agent, or Firm* — Nelson Mullins Riley & Scarborough LLP; Anthony A. Laurentano, Esq.; Lewis Lee, Esq.

(57) ABSTRACT

A control apparatus for controlling an optical receiver having delay paths comprises an optical variable attenuator configured to generate a variable signal and provide the variable signal to the optical receiver; a fine control voltage controller configured to generate a variable fine control voltage and input the variable fine control voltage to one path of the delay paths of the optical receiver; a photo-diode voltage monitor configured to detect a first voltage value and a second voltage value; a bit error rate (BER) checker configured to estimate a bit error rate (BER) according to a signal output from the optical receiver; and a controller configured to set a value of the variable signal and a value of the variable fine control voltage and to estimate the fine control voltage that makes the bit error rate a minimum according to the first voltage value and the second voltage value.

15 Claims, 6 Drawing Sheets

FIG. 5

# METHOD AND APPARATUS FOR CONTROLLING AN OPTICAL RECEIVER HAVING DELAY PATHS

CROSS-REFERENCE TO RELATED APPLICATION(S)

This application claims the benefit under 35 U.S.C. §119(a) of Korean Patent Application No. 10-2011-0051689, filed on May 30, 2011, in the Korean Intellectual Property Office, the entire disclosure of which is incorporated herein by reference for all purposes.

BACKGROUND

1. Field

The following description relates to an optical communication system, and more particularly, to a control apparatus and method for controlling an optical receiver having delay paths.

2. Description of the Related Art

Formats used to generate a high-speed modulated optical signal include Non-Return-to-Zero (NRZ) and Return-to-Zero (RZ), in each of which data is coded on the intensity of an optical signal using a binary code (on or off), and Phase Shift Keying (PSK), Differential Phase Shift Keying (DPSK), and Differential Quadrature Phase Shift Keying (DQPSK) modulation schemes, in each of which a phase of an optical signal is modulated.

As a data transmission speed is increasing, more photo-electric frequency characteristics are needed. To this end, various methods have been introduced to implement a photo-electric or an electric-photo device that requires relatively small signal electrical bandwidth and has an improved data transmission speed by increasing the number of bits being transmitted per symbol. In this regard, DPSK scheme, in which a phase of light is modulated for transmission, in comparison to On-Off Keying schemes, such as NRZ and RZ, in which the intensity of an optical signal is modulated, has been more widely exploited to generate a high-speed optical signal and long-distance transmission, and related research and development have been continuously carried out.

The amplitude of a differential-phase-modulated optical signal is constant, and a phase difference between two neighboring bits has a value of either 0 or p. When a photo-diode directly detects the phase-modulated optical signal, the optical signal needs to be subject to demodulation in which the phase-modulated optical signal is converted into an intensity modulated optical signal. An optical receiver for demodulating a phase-modulated optical signal having information coded on the phase consists of a delay optical path structured in a delay Mach-Zehnder interferometer, a photo-diode, and an amplifier. However, such configuration leads to a structural unbalance in the optical receiver.

SUMMARY

In one general aspect, there is provided a control apparatus for controlling an optical receiver having delay paths, the control apparatus comprising: an optical variable attenuator configured to generate a variable signal and provide the variable signal to the optical receiver; a fine control voltage controller configured to generate a variable fine control voltage and input the variable fine control voltage to one path of the delay paths of the optical receiver; a photo-diode voltage monitor configured to detect a first voltage value and a second voltage value which are, respectively, applied to two photo-diodes in the optical receiver; a bit error rate (BER) checker configured to estimate a bit error rate (BER) according to a signal output from the optical receiver; and a controller configured to set a value of the variable signal generated by the optical variable attenuator and a value of the variable fine control voltage generated by the fine control voltage controller and to estimate the fine control voltage that makes the bit error rate a minimum according to the first voltage value and the second voltage value.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
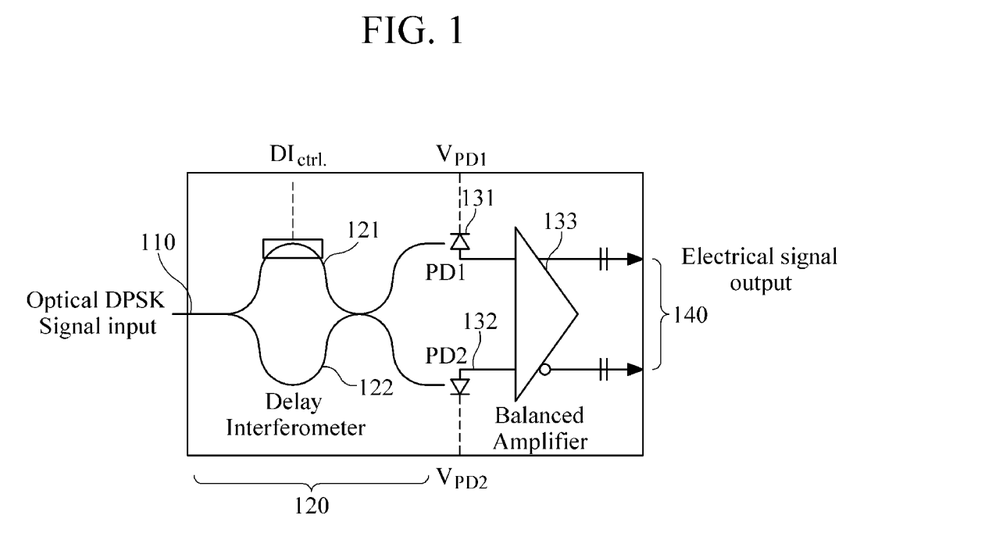
FIG. 1 is a diagram illustrating an example of a general optical receiver.

FIG. 1 illustrates an example of a general optical receiver having delay paths. Referring to FIG. 1, in response to an optical differential phase-shift keying (DPSK) signal through an optical signal input end 110, a delay path unit 120 structured in a Mach-Zehnder interferometer (also, commonly referred to as a delay interferometer (DI)) performs differential phase shift demodulation. More specifically, the optical DPSK signal is split into an upper path 121 and a lower path 122, and a 1-bit delay between the two paths is maintained.

The transmission characteristics of the 1-bit delay Mach-Zehnder interferometer are adjusted firstly, to demodulate a signal by maintaining and adjusting a 1-bit delay, and secondly, to complement and adjust wavelength-dependent characteristics of the interferometer with respect to changes in wavelength of an input optical signal.

For such maintenance and adjustment, the optical receiver is desired to be balanced in configuration, including the delay path unit 120 structured in a 1-bit Mach-Zehnder interferometer and photo-diodes 131 and 132. However, it is difficult to configure a perfectly balanced optical DPSK signal receiver.

A first photo-diode PD1 131 and a second photo-diode PD2 132 photoelectrically convert the amplitude-modulated optical signal, and a balanced amplifier 133 adjusts the amplitude of the converted signal.

The 1-bit delay Mach-Zehnder interferometer performs fine control over one of the two paths so as to control a difference between the two paths to be exactly 1 bit, in an effort to maintain transmission characteristics. The fine control is accomplished by varying a temperature of the path by controlling an external voltage. The optical DPSK signal receiver includes an alternating current (AC)-coupled output end 140.

Figure 2:
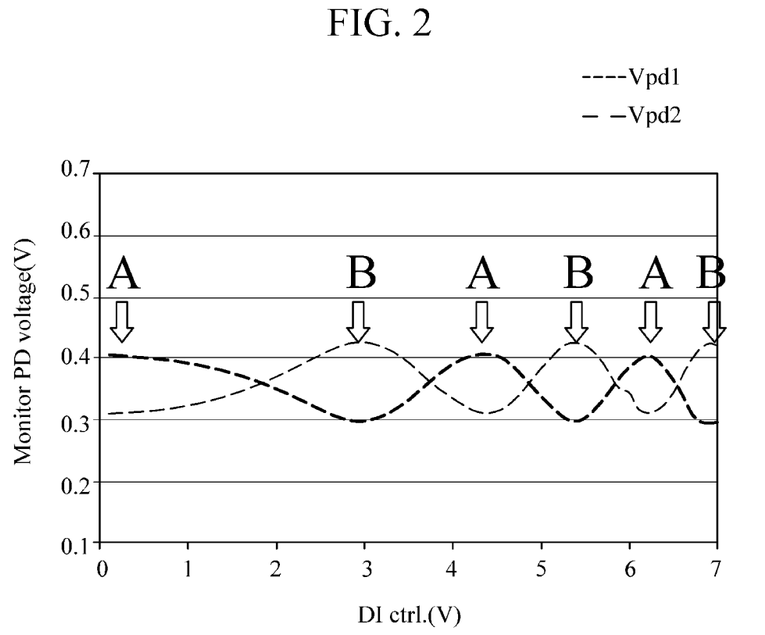
FIG. 2 is a graph showing changes in voltages of two photo-diodes with respect to a fine control (represented as "DI ctrl.) voltage in an optical receiver.

FIG. 2 illustrates a graph illustrating changes in voltages of two photo-diodes with respect to a fine control (in FIG. 2, represented as "DI ctrl.) voltage for controlling one of delay paths in an optical receiver.

Referring to FIG. 2, the graph is made based on an optical signal with an arbitrary amplitude that is input to an optical receiver, wherein the x-axis represents the fine-control (DI ctrl.) voltage for the control of one of the delay paths and the y-axis represents information of optical intensity (monitor PD voltage) that is read by the two photo-diodes.

Values read by the two photo-diodes, that is, information Vpd1 and Vpd2 of optical intensity read by the two photo-diodes, periodically change, and the time interval of the change is decreasing.

At point 'A' in the graph shown in FIG. 2, a difference is maximized between Vpd2 and Vpd1 when Vpd2>Vpd1, and at point 'B', a difference is maximized between Vpd1 and Vpd2 when Vpd1>Vpd1. Point A and point B are shown periodically. The maximum difference at point A is slightly smaller than the maximum difference at point B. This is because of the unbalance among all the elements including a delay path unit structured in a 1-bit delay Mach-Zehnder interferometer and the photo-diodes in the optical receiver.

Figure 3:
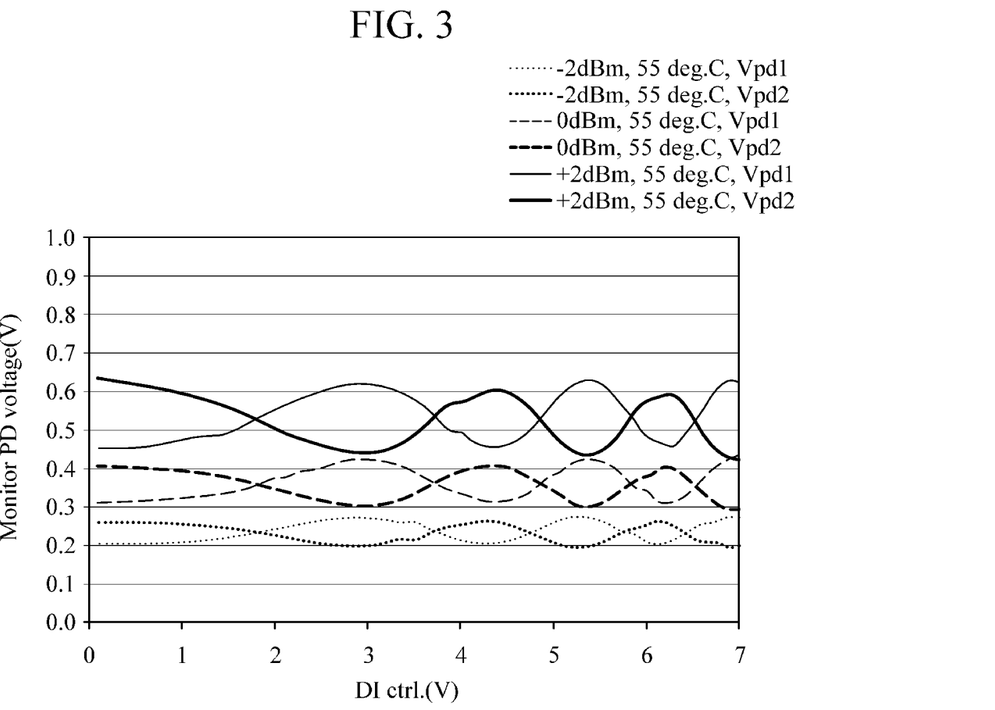
FIG. 3 is a graph showing changes in voltages of two photo-diodes with respect to a fine control (DI ctrl.) voltage in an optical receiver having delay paths that change according to change of an input optical signal.

FIG. 3 illustrates a graph showing changes in voltages of two photo-diodes with respect to a fine control (DI ctrl.) voltage for the control of one of delay paths in an optical receiver having the delay paths that change according to change of an input optical signal.

Referring to FIG. 3, in response to the change of an optical receiver input, voltages of the two photo-diodes are increased or decreased. However, the general tendency of the change in the voltages is similar to the tendency shown in FIG. 2.

Figure 4:
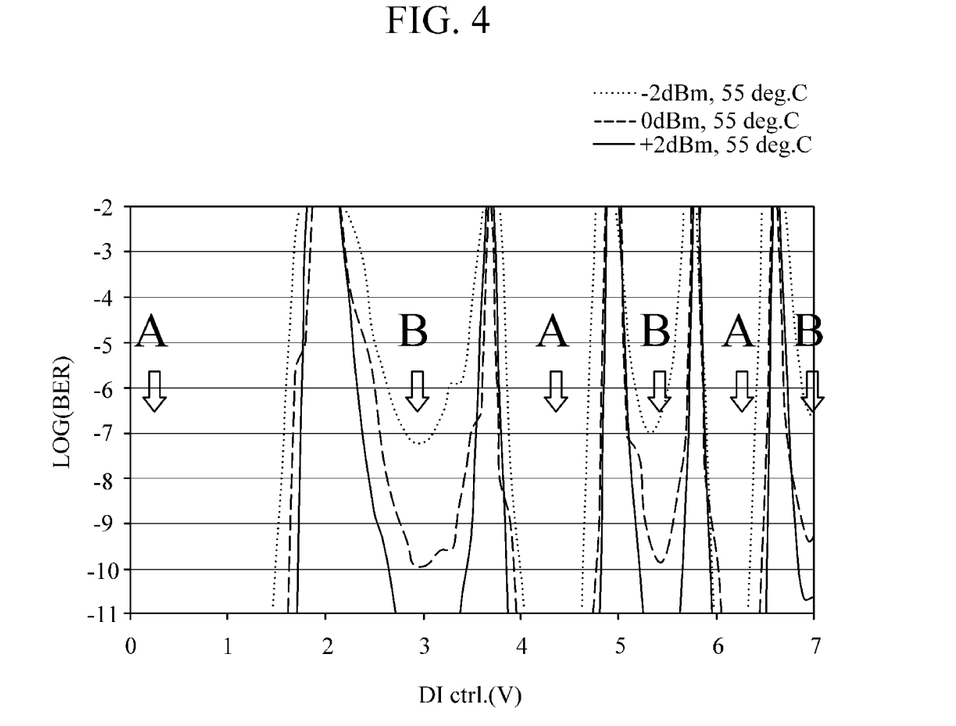
FIG. 4 is a graph showing changes in bit error rate (BER) of an optical receiver output with respect to a fine control (DI ctrl.) voltage in an optical receiver having delay paths that change according to change of an input optical signal.

FIG. 4 illustrates a graph showing changes in bit error rate (BER) of an optical receiver output with respect to a fine-control (DI ctrl.) voltage for the control of one of delay paths in an optical receiver having the delay paths that change according to change of an input optical signal.

At points A and points B as shown in FIGS. 2 and 4, as the optical intensity of a signal input to the optical receiver is reduced from +2 dBm to −2 dBm, a sharp decline in BER is exhibited at points B, when compared to points A. Thus, to prevent such decrease of BER, there are required two procedures as follows.

First, a 1-bit delay adjustment should be controlled by adjusting transmission characteristics of a 1-bit delay Mach-Zehnder interferometer. Second, the wavelength-dependent characteristics of the interferometer with respect to changes in wavelength of an input optical signal should be complemented and controlled.

As shown in FIG. 4, it is noted that an optical receiver can overcome or minimize effects from the unbalanced configuration only at points A.

Thus, to overcome the unbalance in the optical receiver, a method for estimating an optimum fine control (DI ctrl.) voltage for the control of one of delay paths, which is suitable for the optimization of a BER, is provided, whereby the optical receiver having the delay paths identifies a section where Vpd1>Vpd2 and a section where Vpd1<Vpd2 from information that is acquired based on changes in the fine control (DI ctrl.) voltage, two photo-diodes, and the BER of the optical receiver.

Figure 5:
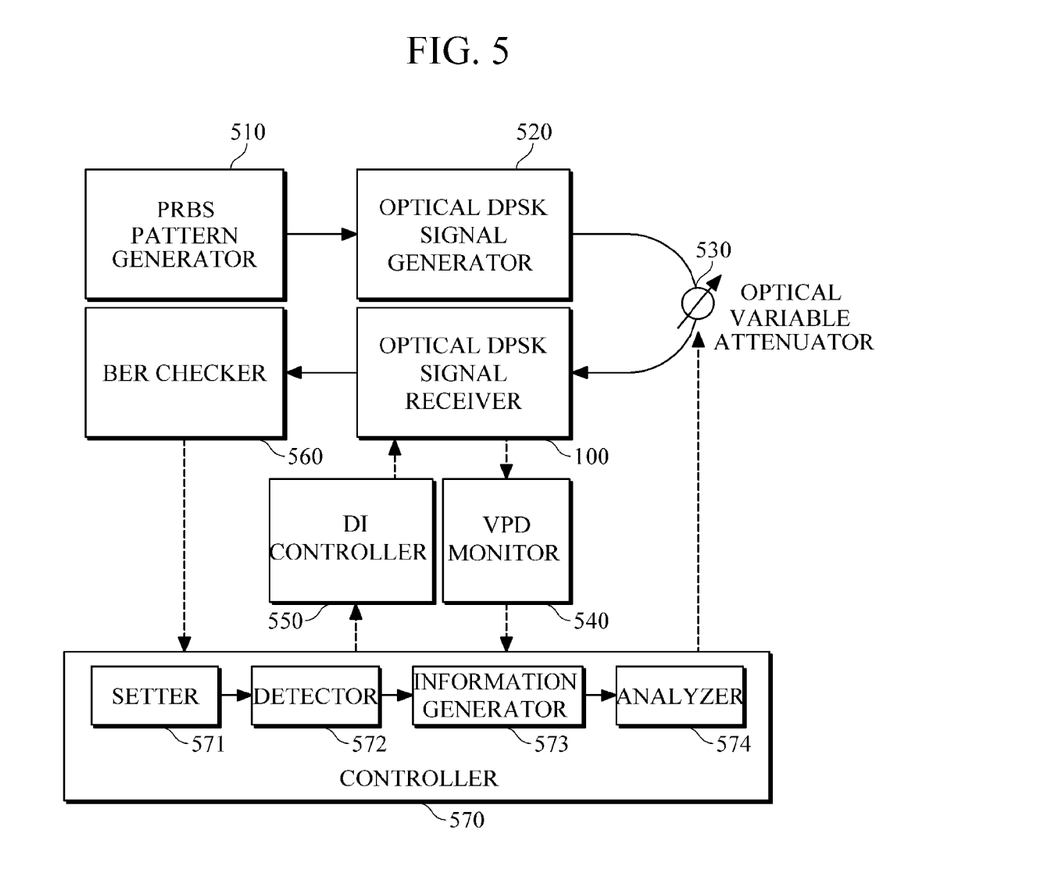
FIG. 5 is a diagram illustrating an example of a control apparatus for controlling an optical receiver having delay paths according to an exemplary embodiment of the present invention.

FIG. 5 illustrates an example of a control apparatus for controlling an optical receiver having delay paths according to an exemplary embodiment of the present invention.

Referring to FIG. 5, a control apparatus for controlling an optical receiver may include a pseudo random bit sequence (PRBS) pattern generator 510, an optical DPSK signal generator 520, an optical variable attenuator 530, a photo-diode voltage (hereinafter, referred to as "Vpd") monitor 540, a fin control voltage (hereinafter, referred to as a delay interferometer (DI)) controller 550, a BER checker 560, and a controller 570.

The optical DPSK signal generator 520 generates an optical DPSK signal. The optical variable attenuator 530 inputs an optical signal that is output from the optical DPSK signal generator 520 in response to a control signal of the controller 570 to an optical DPSK signal receiver 100 to be measured. Referring back to FIG. 1, the Vpd monitor 540 monitors voltages with respect to the optical DPSK signals detected by the first photo-diode PD1 131 and the second photo-diodes PD2 132 of the optical DPSK signal receiver 100. The DI controller 550 controls a fine control voltage of the delay path unit 120 in the optical DPSK signal receiver 100. The BER checker 560 checks a BER of a signal being input from the optical variable attenuator 530 and a BER of a signal being output from the optical DPSK signal receiver 100 and being varied with the fine control voltage of the DI controller 550.

The controller 570 controls the signal input to the optical DPSK signal receiver 100 to be varied by the optical variable attenuator 530, and controls the DI controller 550 to adjust a fine control (DI ctrl.) voltage for the control of one of the path delays in a 1-bit delay Mach-Zehnder interferometer in the optical DPSK signal receiver 100 to be measured, so that the Vpd monitor 540 is controlled to measure voltages 'Vpd values' output from the two photo-diodes being connected to the output of the 1-bit delay Mach-Zehnder interferometer. In addition, the controller 570 analyzes BER information output from the BER checker 560, information from the DI controller 550 about the fine control (DI ctrl.) voltage of the 1-bit delay Mach-Zehnder interferometer, output voltage information of the two photo-diodes measured by the Vpd monitor 540, and optical intensity variable attenuation information. Based on the analysis, the controller 570 separates a section where Vpd1>Vpd2 and a section where Vpd1<Vpd2, and obtains an optimum fine control (DI ctrl.) voltage suitable for the optimization of the BER. To this end, the controller 570 may include a setter 571, a detector 572, an information generator 573, and an analyzer 574.

The setter 571 variably sets the optical variable attenuator 530 and the DI controller 550. For example, the setter 571 may control an input signal of the optical variable attenuator 530 to be sequentially varied from a predefined minimum value to a predefined maximum value. In addition, the setter 571 may control the fine control voltage value of the DI controller 550 to be varied from a predefined minimum value to a predefined maximum value with respect to the varied input signal.

The detector 572 acquires information about a voltage applied to the first and second photo-diodes 131 and 132 of the optical DPSK signal receiver 100 which is detected by the Vpd monitor 540 and the BER information output from the BER checker 560.

The information generator 573 generates graphs as shown in FIGS. 3 and 4 based on the information about a voltage applied to the photo-detectors and the BER information which are acquired by the detector 572.

The analyzer 574 estimates an optimum fine control voltage value by analyzing the information acquired by the detector 572 or the graphs made by the information generator 573. For example, the analyzer 574 may divide the information or the graph into a section in which Vpd1>Vpd2 and a section in which Vpd1<Vpd2, and estimate a different optimum fine control (DI ctrl.) voltage for the control of one of the delay paths, which is suitable for the optimization of the BER of each section.

Figure 6:
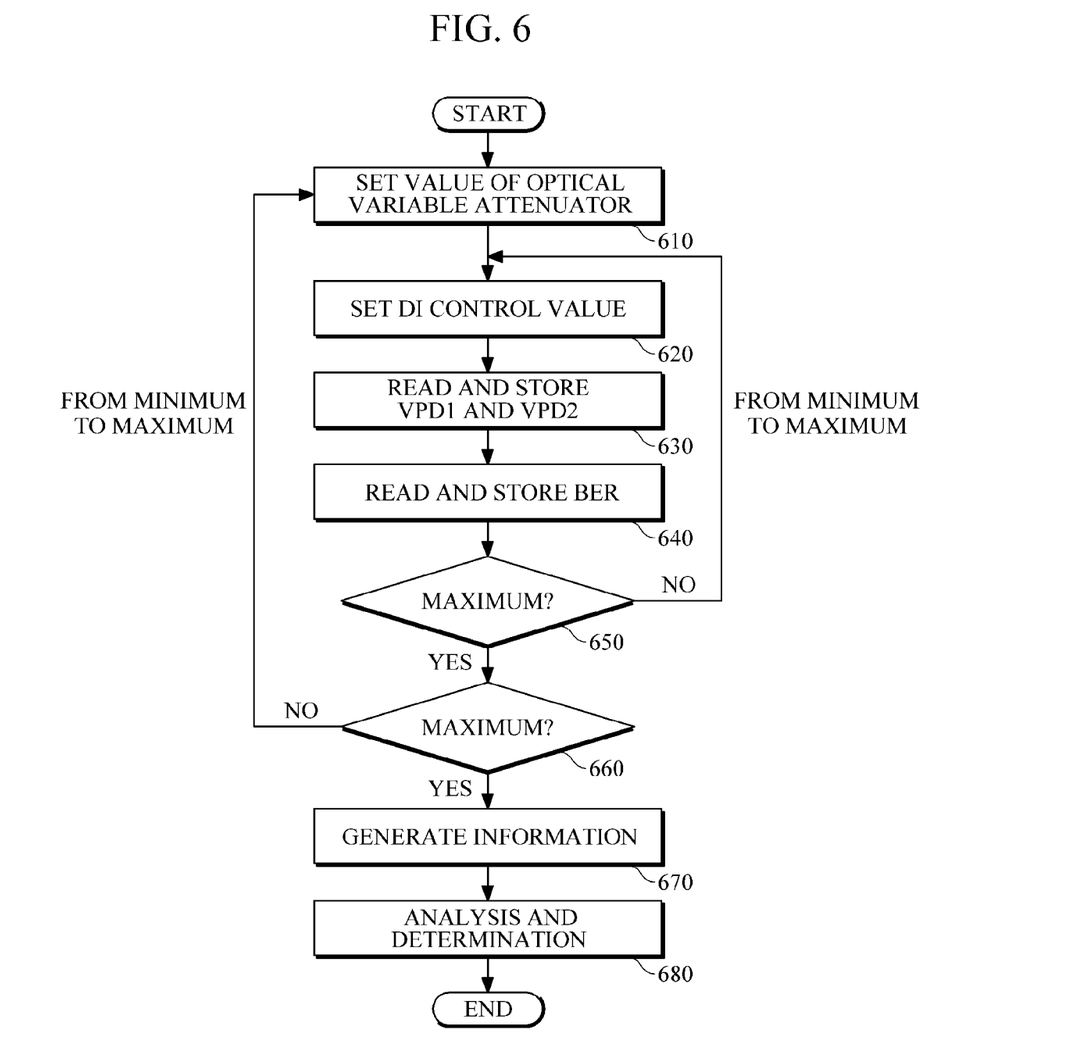
FIG. 6 is a diagram illustrating an example of a flowchart of a method for controlling an optical DPSK signal receiver having delay paths according to an exemplary embodiment of the present invention.

FIG. 6 illustrates an example of a flowchart of a method for controlling an optical DPSK signal receiver having delay paths according to an exemplary embodiment of the present invention.

Referring to FIGS. 6 and FIG. 5, the controller 570 sets a value of the optical variable attenuator 530 in 610. That is, to achieve a graph as shown in FIG. 3, the value of the optical variable attenuator 530 is varied from a minimum value to a maximum value so as to vary an input voltage. The controller 570 sets the value of the optical variable attenuator 530 to the minimum value. In another example, the control unit 570 may set the value of the optical variable attenuator 530 to be varied between the minimum value and the maximum value. In addition, in 620, the controller 570 sets a fine control voltage (delay interferometer (DI)) value and inputs the set value to the DI controller 550. That is, by setting the fine control voltage value to be varied between the minimum value and the maximum value, a graph as shown in FIG. 2 may be obtained based on the set value of the optical variable attenuator 530 being input to the optical DPSK signal receiver 100. The controller 570 sets the value of the DI controller 530 to a minimum. In another example, the control unit 570 may set the value of the DI controller 550 to be varied between the maximum value and the minimum value.

Then, in 630, the controller 570 reads a voltage to be applied to the two photo-diodes PD1 131 and PD2 132 of the optical DPSK signal receiver 100 and stores the read voltage. In addition, the controller 570 obtains and stores a BER measured by the BER checker 560 in 640.

The controller 570 checks whether a DI value is a maximum value in 650. If the DI value is not the maximum value, the controller 570 proceeds with operation 620. In 620, for example, the controller 570 may increase the DI value to achieve a graph as shown in FIG. 2. The controller 570 repeatedly performs operations 620 to 640 so as to measure a photo-diode voltage value and a BER corresponding to the fine control voltage while adjusting the fine control voltage between the minimum value and the maximum value.

Further, the controller 570 determines whether a value of the optical variable attenuator is a maximum value in 660. In response to the determination being made that the value of the optical variable attenuator is not a maximum value, the flows returns operation 610 and the controller 570 resets the value of the optical variable attenuator. That is, by changing the amplitude of an optical signal as described above, a graph as shown in FIG. 2 is achieved. That is, after resetting the value of the optical variable attenuator, the controller 570 sets the DI value to a minimum in 620. The controller 570 repeatedly performs operations 610 to 660 until information required for making a graph as shown in FIG. 3 is obtained.

Through the above-described operations, photo-diode voltage values and BERs for each DI value that is variably set between a minimum and a maximum with respect to the value of the optical variable attenuator which is variably set between a minimum and a maximum are achieved, and thus the controller 570 writes information in 670. In other words, the controller 570 makes graphs as shown in FIG. 3 and FIG. 4 using the achieved information. Thereafter, in 680, the controller 570 performs analysis and determination operations based on the graphs. For example, the controller 570 may divide the graphs into a section in which Vpd1>Vpd2 and a section in which Vpd1<Vpd2, and estimates an optimum fine control (DI ctrl.) voltage value for the control of one of the delay paths, which is suitable for the optimization of a BER of each section.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A control apparatus for controlling an optical receiver having delay paths, the control apparatus comprising:
   an optical variable attenuator configured to generate a variable signal and provide the variable signal to the optical receiver;
   a fine control voltage controller configured to generate a variable fine control voltage and input the variable fine control voltage to one path of the delay paths of the optical receiver;
   a photo-diode voltage monitor configured to detect a first voltage value and a second voltage value which are, respectively, applied to two photo-diodes in the optical receiver;

a bit error rate (BER) checker configured to estimate a bit error rate (BER) according to a signal output from the optical receiver; and a controller configured to set a value of the variable signal generated by the optical variable attenuator and a value of the variable fine control voltage generated by the fine control voltage controller and to estimate the fine control voltage that makes the bit error rate a minimum according to the first voltage value and the second voltage value, wherein the controller is configured to identify in a graph made using the acquired information a section in which a first voltage value is greater than a second voltage value and a section in which the second voltage value is greater than the first voltage value, and to adjust a fine control voltage value to be optimized for each section.

2. The control apparatus of claim 1, wherein the controller is configured to comprise a setter configured to set the input signal and the fine control voltage to be varied, a detector configured to detect a voltage applied to the photo-diode and the bit error rate, and an analyzer configured to analyze the voltage and the bit error rate that are detected by the detector and estimate an optimum fine control voltage value.

3. The control apparatus of claim 1, wherein the controller is configured to further comprise an information generator configured to make the graph which shows changes in the detected voltages applied to the photo-diodes and the detected bit error rate according to varying of the fine control voltage.

4. The control apparatus of claim 3, wherein the analyzer is configured to estimate an optimum fine control voltage value by analyzing the graph made by the information generator.

5. The control apparatus of claim 1, wherein the controller is configured to control an input signal of the optical variable attenuator to be varied sequentially from a predefined minimum value to a predefined maximum value.

6. The control apparatus of claim 1, wherein the controller is configured to adjust the value of the fine control voltage to be varied sequentially from a minimum to a maximum.

7. The control apparatus of claim 1, wherein the controller is configured to detect a first voltage and a second voltage, which are applied to the photo-diodes, and a bit error rate with respect to each variable fine control voltage value.

8. The control apparatus of claim 1, wherein the controller is configured to vary a value of the fine control voltage from a minimum to a maximum with respect to each varying value of the optical variable attenuator.

9. A method for controlling an optical receiver having delay paths, the method comprising:

setting a value of an input signal of the optical receiver and a fine control voltage value on one of the delay paths;

acquiring a first voltage value and a second voltage value which are, respectively, applied to two photo-diodes of the optical receiver, and bit error rate information of a output signal of the optical receiver; and estimating an optimum fine control voltage value according to the acquired information, wherein the estimating of the optimum fine control voltage value comprises identifying in a graph made using the acquired information a section in which a first voltage value is greater than a second voltage value and a section in which the second voltage value is greater than the first voltage value, and adjusting a fine control voltage value to be differently optimized for each section.

10. The method of claim 9, further comprising:

making the graph using the acquired information about the first and the second voltages applied to the photo-diodes and the acquired bit error rate information.

11. The method of claim 9, wherein the setting of the value of the input signal and the fine control voltage value comprises sequentially varying a fine control voltage from a minimum to a maximum or from a maximum to a minimum.

12. The method of claim 9, wherein the setting of the value of the input signal and the fine control voltage value comprises sequentially varying an input signal of the optical receiver from a minimum to a maximum or from a maximum to a minimum.

13. The method of claim 9, wherein the graph shows voltage values which are applied to the two photo-diodes in accordance with varying of the fine control voltage value.

14. The method of claim 13, wherein the graph shows a signal value of each variable signal input to the optical receiver.

15. The method of claim 13, wherein the graph includes a graph that shows a bit error rate that is varied in accordance with varying of the fine control voltage value.

* * * * *